United States Patent
Ishii et al.

(10) Patent No.: US 6,833,784 B1
(45) Date of Patent: Dec. 21, 2004

(54) ELECTRIC VEHICLE

(75) Inventors: Hiroshi Ishii, Tachikawa (JP); Takashi Aoki, Tachikawa (JP); Nobuhito Ohnuma, Atsugi (JP)

(73) Assignee: Tokyo R & D Co., Ltd., Toyko (JP)

( * ) Notice: Subject to any disclaimer, the term of this patent is extended or adjusted under 35 U.S.C. 154(b) by 255 days.

(21) Appl. No.: 10/069,531

(22) PCT Filed: Aug. 31, 2000

(86) PCT No.: PCT/JP00/05926

§ 371 (c)(1),
(2), (4) Date: Mar. 6, 2002

(87) PCT Pub. No.: WO01/17829

PCT Pub. Date: Mar. 15, 2001

(30) Foreign Application Priority Data

Sep. 7, 1999 (JP) .......................................... 11/253432

(51) Int. Cl.⁷ ............................................. B60R 25/10
(52) U.S. Cl. ................................. 340/426.1; 340/426.11; 340/426.36; 340/5.1; 340/5.2; 340/5.31; 351/10.2; 351/10.4
(58) Field of Search .......................... 340/426.1, 425.5, 340/428, 426.11, 426.33, 426.36, 5.1, 5.2, 5.21, 5.3, 5.31; 307/10.1, 10.2, 10.3, 10.4, 10.5, 10.7

(56) References Cited

U.S. PATENT DOCUMENTS

| | | | |
|---|---|---|---|
| 4,232,289 A | 11/1980 | Daniel | 340/64 |
| 4,553,127 A | 11/1985 | Issa | 340/64 |
| 5,023,591 A | 6/1991 | Edwards | 340/426 |
| 5,594,319 A | 1/1997 | Thandiwe | 320/2 |
| 5,635,916 A * | 6/1997 | Bucholtz et al. | 340/5.24 |
| 5,704,008 A | 12/1997 | Duvall et al | |

FOREIGN PATENT DOCUMENTS

| | | |
|---|---|---|
| DE | 43 05 361 | 8/1994 |
| DE | 43 39 234 | 8/1994 |
| JP | 62-273141 | 11/1987 |
| JP | 63-122149 | 8/1988 |
| JP | 1-317852 | 12/1989 |
| JP | 2-246850 | 10/1990 |
| JP | 7-146987 | 6/1995 |
| JP | 9-177398 | 7/1997 |
| JP | 10-131568 | 5/1998 |

OTHER PUBLICATIONS

European Search Report dated Sep. 12, 2002.
Office action and translation dated Sep. 18, 2003 from the corresponding International application.

* cited by examiner

*Primary Examiner*—Julie Lieu
(74) *Attorney, Agent, or Firm*—Westerman, Hattori, Daniels & Adrian, LLP

(57) ABSTRACT

An electric vehicle (1) including a rechargeable secondary battery (30), an electric motor (9) for driving a running section such as wheels and the like and a controller (5) for conducting control to drive the electric motor by electric power from the secondary battery (30) is provided with a nonvolatile memory (6) for storing a password, a display and operation unit (7) for inputting a password, means (the controller (5) may also serve) for bringing the vehicle into a state capable of being driven only when the password inputted through the display and operation unit (7) matches the password stored in the memory (6).

8 Claims, 7 Drawing Sheets

F I G. 2
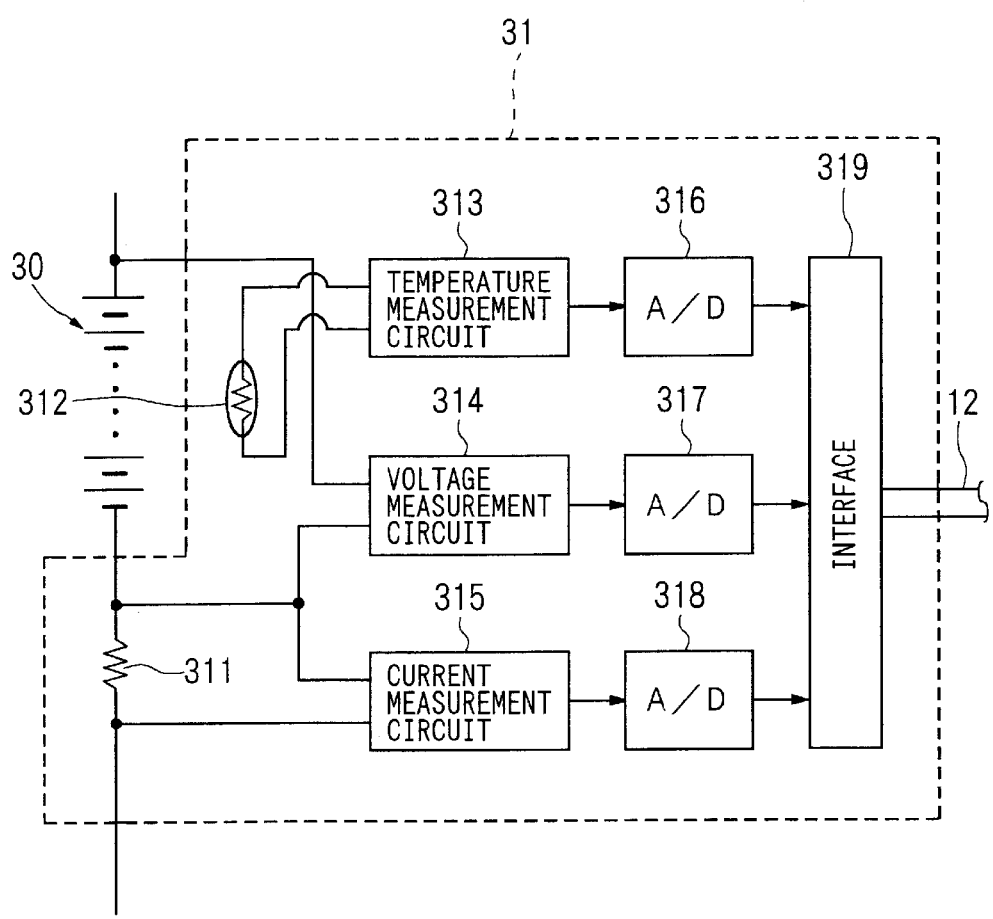

ELECTRIC VEHICLE

TECHNICAL FIELD

The present invention relates to an electric vehicle, for example, a compact electric automobile, an electric bicycle, an electric wheelchair or the like using a rechargeable secondary battery and an electric motor driven by electric power of the battery and, more specifically, to a technology of preventing illegal use and theft of the electric vehicle.

BACKGROUND TECHNOLOGY

In the present state of affairs, there is no end to the illegal use or theft of motor-assisted bicycles, motorcycles and the like, and an electric vehicle is also susceptible to the same risks. In addition, a secondary battery used in the electric vehicle is expensive, and thus it is necessary to protect it from being stolen. Moreover, this also applies to the charger for charging the secondary battery.

In a conventional electric vehicle, however, allowance/disallowance of drive/movement is controlled only by a mechanical key, not by an electronic one, with protection insufficient against illegal use or theft. Further, there is no antitheft means for critical components such as the secondary battery and the charger in the status quo.

The present invention is made to eliminate the disadvantages of the prior arts as described above.

More specifically, its object is to make improvement in prevention of illegal use and theft of an electric vehicle to thereby prevent it from being stolen. Further, its other objects are to enhance antitheft effects and to improve usability and further, when a critical component such as a secondary battery or a charger has been stolen, to prevent the component from being used in other electric vehicles.

DISCLOSURE OF THE INVENTION

In order to achieve the above-described objects, this invention is made such that an electric vehicle including at least a pack of rechargeable secondary battery and a charger for charging the secondary battery which are mounted on a vehicle main body to be attachable/detachable thereto/therefrom respectively, an electric motor for driving a running section such as wheels and the like, and a controller for conducting control to drive the electric motor by electric power of the secondary battery is configured as follows.

Specifically, nonvolatile memories for storing a password are arranged in the vehicle main body, each secondary battery and the charger respectively, and a display and operation unit for inputting a password and means for bringing the vehicle into a state capable of being driven only when the password inputted through the display and operation unit matches all of the passwords stored in the respective memories of the vehicle main body, each secondary battery and the charger, are arranged in the vehicle main body.

Alternatively, it is more preferable that a display and operation unit for inputting a password, a key switch, and means for bringing the vehicle into a state capable of being driven only when the password inputted through the display and operation unit matches all of the passwords stored in the respective memories of the vehicle main body, each secondary battery and the charger after the key switch turns ON, are arranged in the vehicle main body.

In each of these electric vehicle, a wheel rotation detector for detecting rotation of the wheels, an alarm generator such as a buzzer, a siren or the like, and means for determining whether or not the vehicle is moved by a predetermined specified value or more based on rotation detection information from the wheel rotation detector in a key-OFF state or in a waiting state, allowing the alarm generator to give an alarm and the display and operation unit to display a request for input of a password when the determination is made that the vehicle is moved by the predetermined specified value or more, and thereafter stopping the alarm by the alarm generator only when the password inputted through the display and operation unit matches all of the passwords stored in the respective memories of the vehicle main body, each secondary battery and the charger, are provided, which makes it possible to prevent theft.

Alternatively, means for allowing the display and operation unit to display a request for input of a password when the determination is made that the vehicle is moved by the predetermined specified value or more based on rotation detection information from the wheel rotation detector in a key-OFF state or in a waiting state, and thereafter allowing the alarm generator to give an alarm when a password is not inputted through the display and operation unit in a predetermined period of time or when the inputted password does not match all of the passwords stored in the respective memories of the vehicle main body, each secondary battery and the charger, may be provided.

Further, in each of these electric vehicle, the display and operation unit has a password change mode selector, and means is provided which, only when the password inputted through the display and operation unit matches all of the passwords stored in the respective memories of the vehicle main body, each secondary battery and the charger after a password change mode is selected by the password change mode selector, allows the respective memories to rewrite and store a new password inputted thereafter, which makes it possible that only a person who knows the password stored in them can change the password arbitrarily only when a proper secondary battery and charger are mounted.

BRIEF DESCRIPTION OF DRAWINGS

FIG. 2 is a block circuit diagram showing a concrete configuration example of a measuring means 31 provided in battery units 3A and 3B in FIG. 1;

BEST MODE FOR CARRYING OUT THE INVENTION

Hereinafter, preferred embodiments of the present invention will be described based on the drawings.

Figure 1:
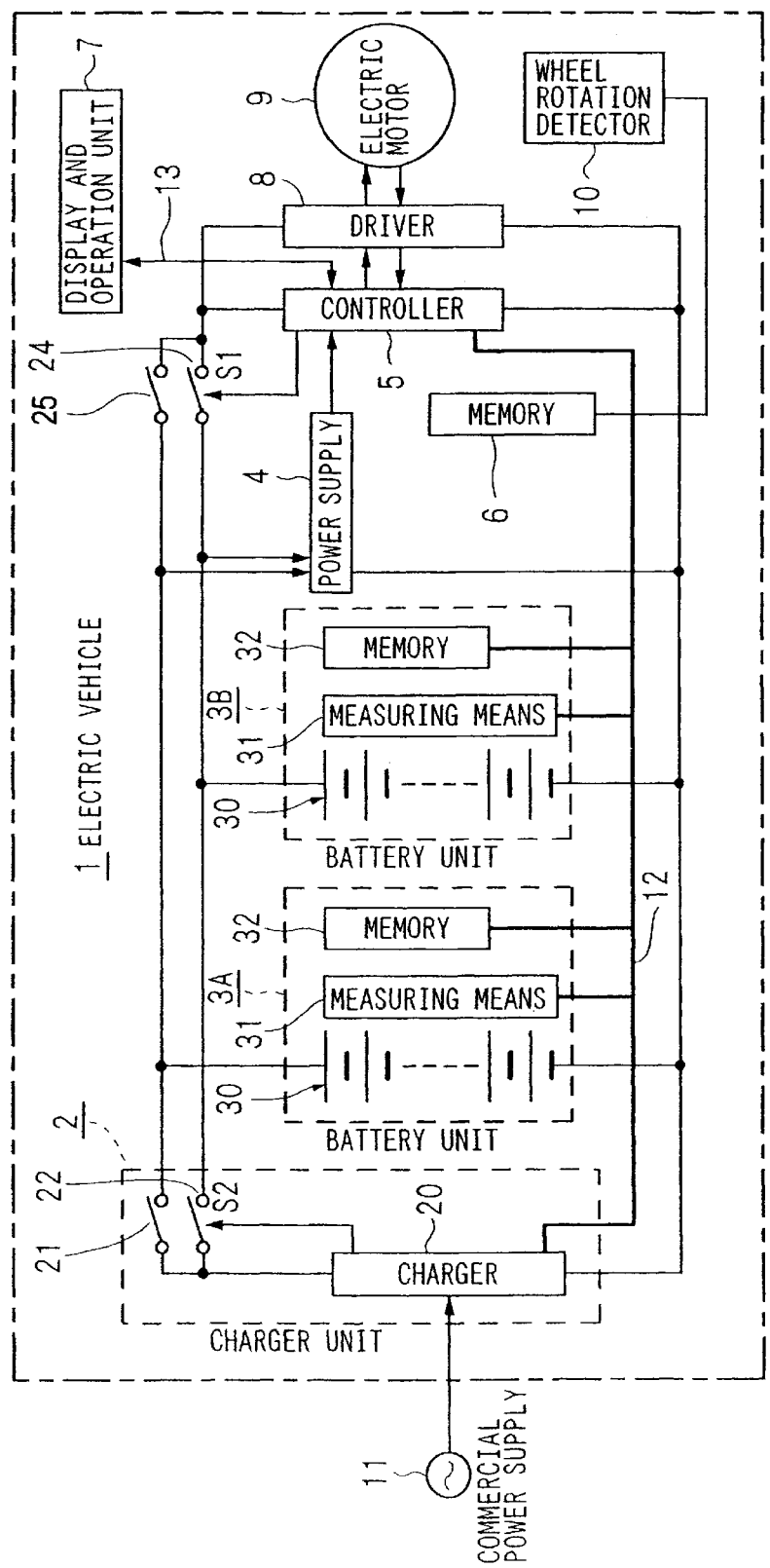
FIG. 1 is a block circuit diagram showing the configuration of a first embodiment of an electric vehicle according to the invention.

First, a first embodiment of an electric vehicle according to the invention is explained with FIG. 1 to FIG. 4. FIG. 1 is a block circuit diagram showing the configuration of the first embodiment of the electric vehicle according to the invention.

An electric vehicle 1 of this embodiment is constituted by a charger unit 2, battery units 3A and 3B (an example in which two battery units are mounted is shown in this embodiment, but one battery unit or more may be adoptable), a power supply 4, a controller 5, a memory 6, a display and operation unit 7, a driver 8, an electric motor 9, a wheel rotation detector 10 and so on.

The charger unit 2 is constituted by a charger 20 being a charger means supplied with electric power from a commercial power supply 11 or an alternative power supply to charge respective secondary batteries 30 of the battery units 3A and 3B and switches 21 and 22 controlled by a switch control signal S2 from the charger 20 to switch to either the battery unit 3A or 3B to be charged. Further, the charger 20 includes an interface with a system bus 12.

Each of the battery units 3A and 3B is constituted by a rechargeable secondary battery (which may be a battery pack composed of a plurality of storage batteries or an alternative electric energy storage means) 30; a measuring means 31 constituted by a sensor and a measurement circuit for measuring output voltage and charge and discharge current values of the secondary battery 30 and measuring temperature of the secondary battery 30 or ambient temperature and an interface with the system bus 12; and a memory 32 constituted by a nonvolatile memory such as an EEPROM for storing properties of the secondary battery 30 and battery information needed by the electric vehicle 1 measured by the measuring means 31, and an interface with the system bus 12 for making it possible to read and write the data.

It should be noted that the charger unit 2 and the battery units 3A and 3B are fixedly provided on the body of the electric vehicle 1 not to be easily removed therefrom.

The memory 6 is constituted by a nonvolatile memory such as an EEPROM for storing at least a usable user's password (an initial password at the time of shipping) and wheel rotation information, and an interface with the system bus 12 for making it possible to read and write the data.

The controller 5 includes a control function by means of a microcomputer, a digital signal processor or the like and also has a function according to the invention such as; control regarding the operation of the electric vehicle such as determination of which battery unit is used based on the information from the display and operation unit 7, the battery information stored in the respective memories 32 of the battery units 3A and 3B and the like, switching switches 24 and 25 according to a switch control signal S1, how the driver 8 is operated and the like; comparison and determination between an inputted password and the password stored in the memory 6 and the like, so as to perform centralized control of the electric vehicle 1.

The power supply 4 is supplied with electric power from the battery units 3A and 3B or the charger unit 2 to supply necessary power to the controller 5.

The display and operation unit 7 is constituted by a function of displaying necessary states and information such as a state of the electric vehicle 1, a state of the charger unit 2, time and the like; a key switch for instructing the electric vehicle 1 to run; a keyboard capable of inputting a password and other necessary instructions and the like, so that display information is sent from the controller 5 via an operation bus 13, and operation information is sent to the controller 5 via the operation bus 13. Further, a password change mode selector described later is also included.

Further, an alarm such as a buzzer, a siren or the like which gives an alarm in response to the instruction from the controller 5 may be provided in the display and operation unit 7.

The wheel rotation detector 10 is constituted by a detector for detecting rotation of wheels of the electric vehicle 1 and an interface with the system bus 12. The detection contents by the detector may be that with which movement of the electric vehicle 1 such as the direction of rotation of the wheels and the number of rotations or the like can be determined. If the electric motor 9 is directly connected to the wheels by a gear, a chain or the like, the rotation of the wheels can be detected by the rotation of the electric motor 9.

The driver 8 is supplied with electric power from the battery units 3A and 3B, and drives and controls the electric motor 9 in response to a control signal from the controller 5.

The electric motor 9 is a DC motor, a DC brushless motor or the like for driving the running section such as the wheels and the like of the electric vehicle 1, and may include an actuator and the like for actuating a break and the like.

The system bus 12 is a bus used for transferring information to and from the charger 20 of the charger unit 2, the respective measuring means 31 and memories 32 of the battery units 3A and 3B, the memory 6 on the side of the vehicle main body, the wheel rotation detector 10 and the controller 5 and is generally constituted by a data bus, an address bus and a control bus, but a serial bus, a parallel bus or any other constitution may be adopted if only information can be transferred to and from each unit and component.

The charger 20 of the charger unit 2 includes a circuit for making alternative current supplied from the commercial power supply 11 to a direct voltage suitable for charge and outputting it, and a control function by means of a microcomputer or the like, obtains information such as a residual battery capacity and the battery properties stored in the memories 32 of the battery units 3A and 3B and the measured information by the measuring means 31 via the system bus 12, and determines the method of charging the respective secondary batteries 30, the order of charge and the like.

Then, the charger 20 turns ON one of the switches 21 and 22 by the switch control signal S2 to select a charger unit to be charged, and performs an optimal charge to the secondary battery 30 of the charger unit according to the information from the memory 32 and the measuring means 31.

The charger unit 2, however, is not essential for the electric vehicle 1, and thus it may be suitable to place a charger device at a place with the commercial power supply 11 or an alternative power supply outside the vehicle and, when charge is conducted to the secondary battery 30, to move the electric device 1 close to the charger device and connect the battery unit 3A or 3B to the charger device to conduct charge.

Here, a concrete example of the measuring means 31 provided in the battery units 3A and 3B respectively is shown in FIG. 2.

The measuring means 31 is constituted by a resistance 311 with a small resistance value for measuring an electric current, which is connected in series with the secondary battery 30, a thermistor 312 being a sensor for measuring temperature, which is provided in close contact with or in the vicinity of the secondary battery 30, a temperature measurement circuit 313, a voltage measurement circuit 314, a current measurement circuit 315, A/D conversion circuits 316, 317 and 318, and an interface 319 with the system bus 12.

The temperature measurement circuit 313 converts a change in a resistance value caused by temperature of the thermistor 312 into a voltage, measures the temperature of the secondary battery 30 or the ambient temperature, converts the measured value into a digital value with the A/D conversion circuit 316, and outputs it to the system bus 12 via the interface 319. If the thermistor 312, the temperature measurement circuit 313, and the A/D conversion circuit 316 are provided for each cell of the secondary battery 30, or for each of a plurality of cell groups, the temperature measurement can be carried out more minutely.

The voltage measurement circuit 314 measures terminal voltage of the secondary battery 30, converts the measured value into a digital value with the A/D conversion circuit 317, and outputs it to the system bus 12 via the interface 319. Incidentally, if the voltage measurement circuit 314 and the A/D conversion circuit 317 are provided for each cell of the secondary battery 30, or for each of a plurality of cell groups, the voltage measurement can be carried out more minutely.

The current measurement circuit 315 measures a value of a discharge current or a charge current of the secondary battery 30 by measuring voltage drop caused by the resistance 311, converts the measured value into a digital value with the A/D conversion circuit 318, and outputs it to the system bus 12 via the interface 319. Incidentally, there is a method of detecting the current using a hall device, a current transformer or the like in place of the resistance 311.

Next, action according to the invention in the electric vehicle 1 of the first embodiment shown in FIG. 1 is explained.

Figure 3:
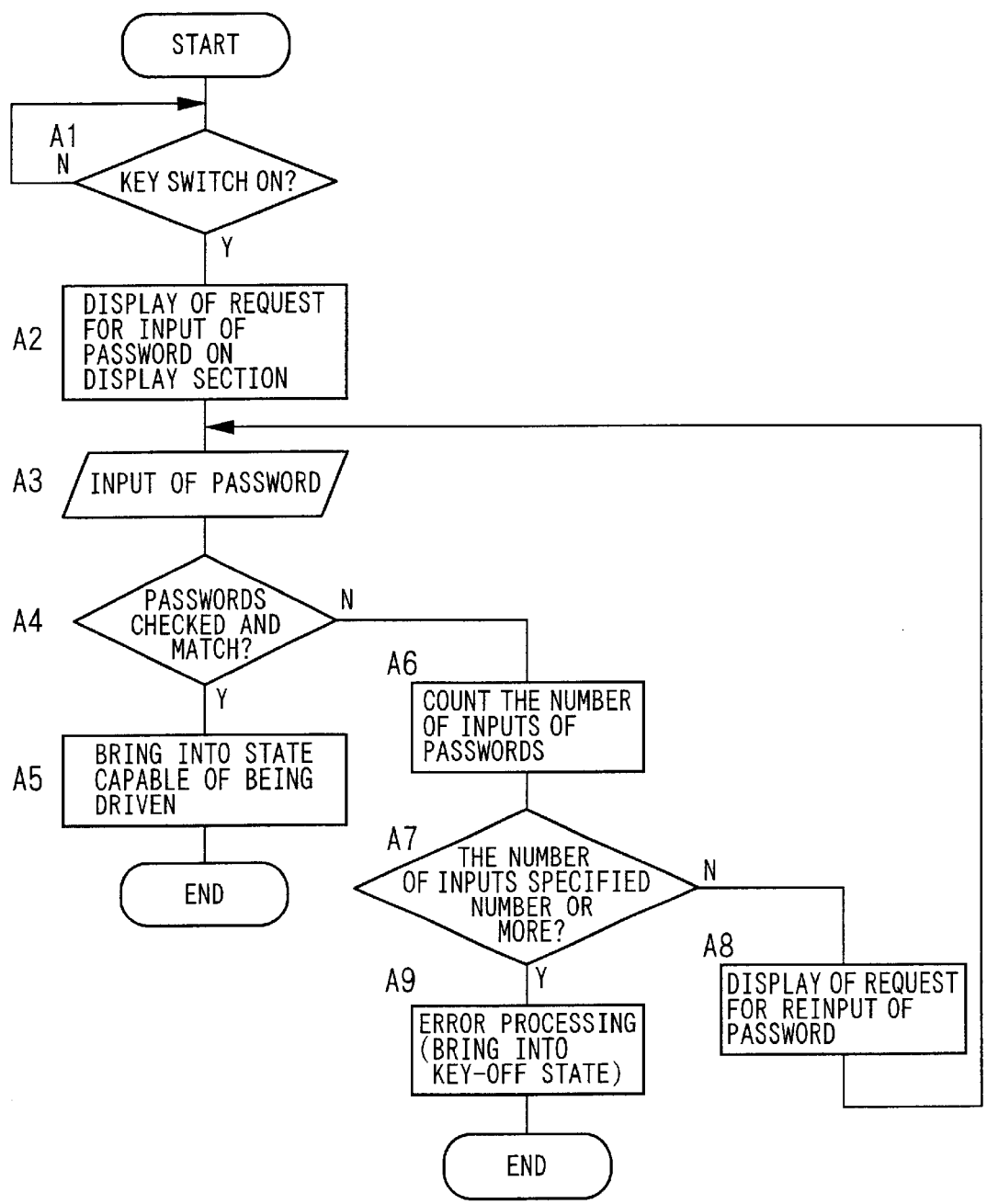
FIG. 3 is a flowchart showing the process of processing by a controller regarding a function of preventing illegal use and theft by means of a key switch and a password in the electric vehicle shown in FIG. 1.

First, explanation is made regarding a function of preventing illegal use and theft by means of the combined use of a key switch (mechanical key) and a password with FIG. 3. FIG. 3 is a flowchart showing the process of processing by the controller 5 from a key-OFF state of the electric vehicle 1 to a state capable of being driven.

The controller 5 is operating even during non-operation state (waiting state) of the electric vehicle 1 and executing the processing shown in FIG. 3.

When this processing starts, the controller 5 checks via the operation bus 13 whether or not the key switch of the display and operation unit 7 is ON, that is, whether or not there is a drive request to the electric vehicle (key-ON state) by key operation by a user in step A1.

When the drive request is confirmed because of the key-ON state, the controller 5 performs display of a request for input of a password on a display section of the display and operation unit 7 via the operation bus 13 in step A2, and waits for a password to be inputted.

When a password is inputted by a predetermined method by the user in step A3, the controller 5 obtains the registered user's password from the memory 6 via the system bus 12 and compares it with the inputted password in step A4. When both passwords match, the controller 5 brings the electric vehicle 1 into a state capable of being driven in step A5 and ends this processing.

When both passwords do not match, the controller 5 counts the number of inputs of passwords in step A6. Then, the controller 5 determines whether or not the number of the inputs is a predetermined (specified) number or more in step A7, and when the number is less than the specified number, the controller 5 performs display of a request to reinput a password on the display section of the display and operation unit 7 in step A8, and returns to the state of waiting for a password to be inputted.

When the number of inputs of passwords is the specified number or more in step A7, the controller 5 shifts the state of the electric vehicle 1 from the state of a password being inputted by key ON operation by the user to the key-OFF state (state incapable of being driven) as error processing in step A9 and ends this processing.

For releasing this state, it is conceivable that the state is released when the turning-ON operation is conducted again to the key switch from the turning-OFF operation, but in order to prevent theft more certainly, it is also possible that the turning-ON operation of the key switch becomes effective only after a lapse of a fixed period of time, for example, one hour later to thereby take time for restarting.

Further, the electric vehicle 1 is brought into the key-OFF state when mismatch of passwords is repeated, but a method is also conceivable that gives an alarm by a buzzer, a siren or the like in place of or concurrently with the key-OFF state.

Figure 4:
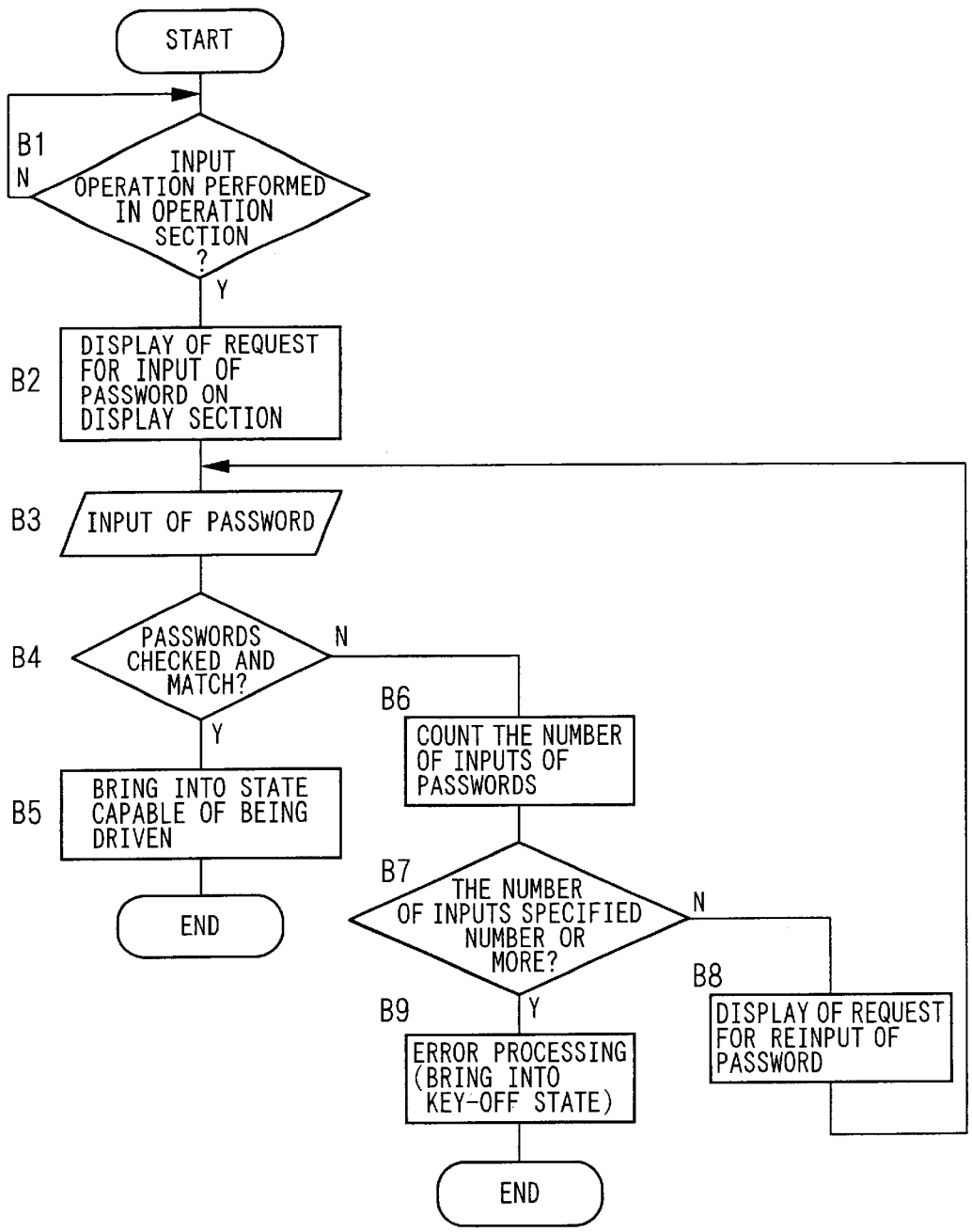
FIG. 4 is a similar flowchart showing the process of processing by the controller regarding a function of preventing illegal use and theft only by a password.

Next, explanation is made regarding a function of preventing illegal use and theft only by a password without using a key switch (mechanical key) using a flowchart in FIG. 4.

The controller 5 is operating even during non-operation state (waiting state) of the electric vehicle 1 and executing the processing shown in FIG. 4.

When this processing starts, the controller 5 is monitoring via the operation bus 13 operation to the display and operation unit 7 by the user in step B1. When some input operation is conducted, the controller 5 recognizes it as a request for operation of inputting a password to go into a password input mode, performs display of a request for input of a password on the display section in step B2, and waits for a password to be inputted.

Processing from step B3 to step B9 is the same as each processing from step A3 to step A9 in FIG. 3.

It should be noted that in the error processing in step B9, the controller 5 shifts the state of the electric vehicle 1 from the password input state to the waiting state (state incapable of being driven). Conditions for releasing this state are also the same as in the aforementioned case.

Figure 5:
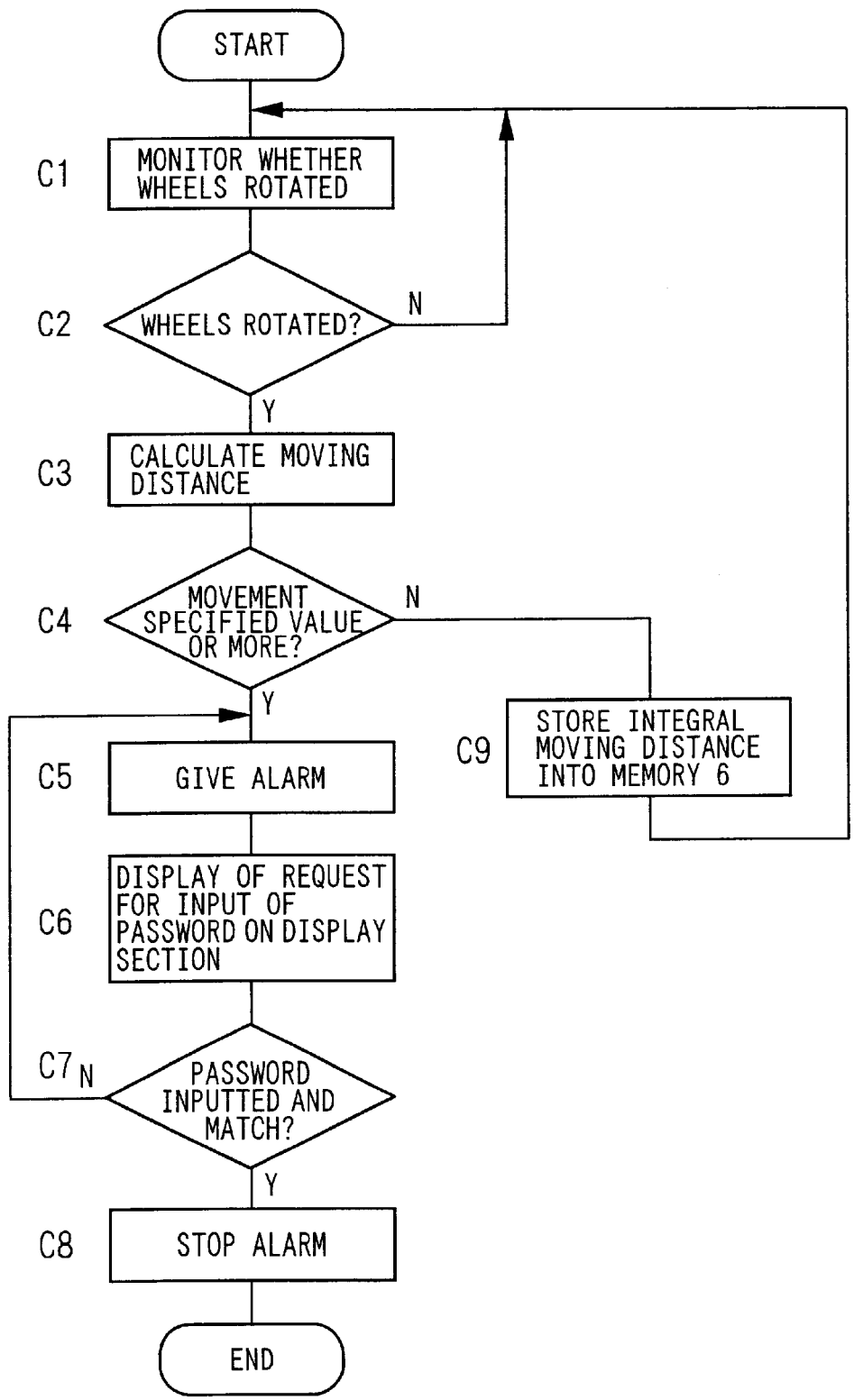
FIG. 5 is a similar flowchart showing the process of processing by the controller regarding a function of preventing theft when the electric vehicle in a key-OFF state or in a waiting state is moved.

Next, explanation is made based on a flowchart in FIG. 5 regarding a function of preventing theft when the electric vehicle 1 in the key-OFF state or in the waiting state is moved.

When the electric vehicle 1 is in the key-OFF state or in the waiting state, the controller 5 executes the processing shown in FIG. 5. It thus monitors via the system bus 12 rotation of the wheels by obtaining the information detected by means of the wheel rotation detector 10 in step C1. Subsequently, the controller 5 checks movement of the electric vehicle based on whether or not the wheels are rotated from the obtained information, in step C2.

Until the controller 5 determines that the wheels are rotated, it executes steps C1 and C2 repeatedly. When the controller 5 determines that the wheels are rotated, it proceeds to step C3 and calculates a moving distance from the obtained wheel rotation information. In this event, if data on the moving distance is stored in the memory 6, the controller 5 reads via the system bus 12 the data on the moving distance and adds a newly calculated moving distance thereto to calculate an integral moving distance.

Then, the controller 5 compares the integral moving distance with a prescribed specified value, that is, an allowable moving distance in step C4.

As a result, if the integral moving distance is less than the specified value, the controller 5 stores the integral moving distance into the memory 6 via the system bus 12 in step C9, and then returns to step C1 and monitors again whether or not the wheels are rotated. If the integral moving distance is the specified value or more, the controller 5 actuates the buzzer, the siren or the like of the display and operation unit 7 to give an alarm which people thereabout can recognize in step C5, performs display of a request for input of a password on the display section of the display and operation unit 7 in step C6, and shifts to the state of waiting for a password to be inputted.

When a password is inputted by the user, the controller 5 obtains the registered password from the memory 6 via the operation bus and compares it with the inputted password in step C7. Then, when the passwords match, the controller 5 stops the alarm of the buzzer, the siren or the like in step C8, clears the integral moving distance stored in the memory 6 via the system bus, and ends this processing.

When a password is not inputted or when a password, even if inputted, does not match the registered password, the controller 5 returns to step C5, performs again display of a request for input of a password on the display section in step C6 while the alarm, the siren or the like is kept given, and shifts to the state of waiting for a password to be inputted.

This prevents a stranger who does not know the registered password from illegally moving the electric vehicle 1 when the electric vehicle 1 is in the key-OFF state or in the waiting state, so as to prevent theft.

The data on the integral moving distance stored in the memory 6 is cleared by inputting a correct password in this embodiment, and further it may be cleared after a lapse of a predetermined period of time. Furthermore, the direction of movement of the electric vehicle 1 is not specified in this embodiment, but management may be conducted in conjunction also with the information on the direction of rotation obtained from the wheel rotation detector 10.

In the above-described embodiment, if the electric vehicle 1 is moved by the moving allowable distance (specified value) or more, an alarm is given until a correct password is inputted even when it is moved by a person who is allowed to use it.

Therefore, when the controller 5 determines that the moving distance is the specified value or more in step C4 in FIG. 5, it may perform display of a request for input of a password on the display section before giving an alarm, and when a password is inputted and matches the registered password, it may clear the integral moving distance stored in the memory 6 without giving an alarm and end this processing. When a password is not inputted before a fixed period of time elapsed or when a password, even if inputted, does not match the registered password, it may give and keep an alarm until the registered password is inputted thereafter.

Figure 6:
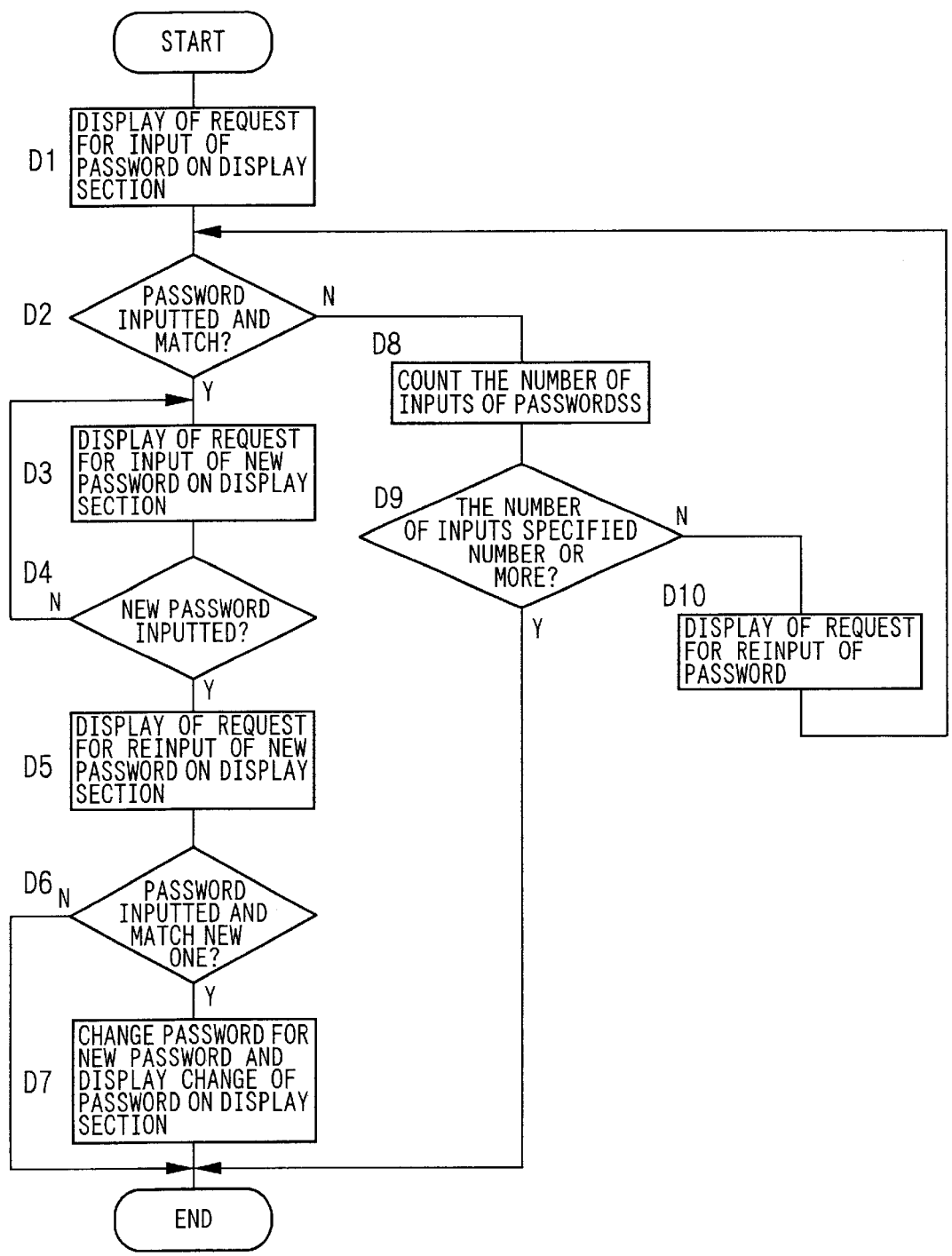
FIG. 6 is a similar flowchart showing the process of processing by the controller regarding change of a password.

Next, action of changing a password is explained with a flowchart in FIG. 6.

When processing goes into the password change mode by operation of the password change mode selector of the display and operation unit 7 by the user, the controller 5 executes the processing shown in the flowchart in FIG. 6.

First, the controller 5 performs via the operation bus 13 display of a request for input of a password on the display section in step D1 and shifts to the state of waiting for a password to be inputted.

Thereafter, when a password is inputted by the user, the controller 5 obtains the registered password from the memory 6 via the system bus 12 and compares it with the inputted password in step D2.

When the passwords do not match, the controller 5 counts the number of inputs of passwords in step D8, determines whether or not the counted number of the inputs is the predetermined specified number or more in step D9, and when it is less than the specified number, the controller 5 performs display of a request for reinput of a password on the display section in step D10, and returns to the state of waiting for a password to be inputted.

When the number of inputs of passwords is the specified number or more in step D9, the controller 5 ends the processing of the flowchart without changing the password.

When the passwords match in step D2, the controller 5 performs display of a request for input of a new password on the display section in step D3 and shifts to the state of waiting for input where it determines input of a new password in step D4.

When a new password is inputted, the controller 5 performs display of a request for reinput of the new password on the display section in step D5. Thereafter, when the user inputs the new password once more, the controller 5 compares the new password inputted for the first time with the new password inputted for the second time in step D6.

As a result, when the two passwords match, the controller 5 changes the password stored (registered) in the memory 6 for the new password, displays the change of the password on the display section, and ends the processing of this flowchart.

When a password is not inputted for the second time in a predetermined period of time or when a password, even if inputted, does not match the previously inputted password, the controller 5 ends the processing of the flowchart without changing the password.

Thus, the owner of the electric vehicle 1 or a person who is allowed to use it can arbitrarily change an initial password registered at the time of shipping of the electric vehicle 1 or a password which has been registered thereafter, so as to prevent possibility of an illegal use by a stranger who accidentally knows the password.

Figure 7:
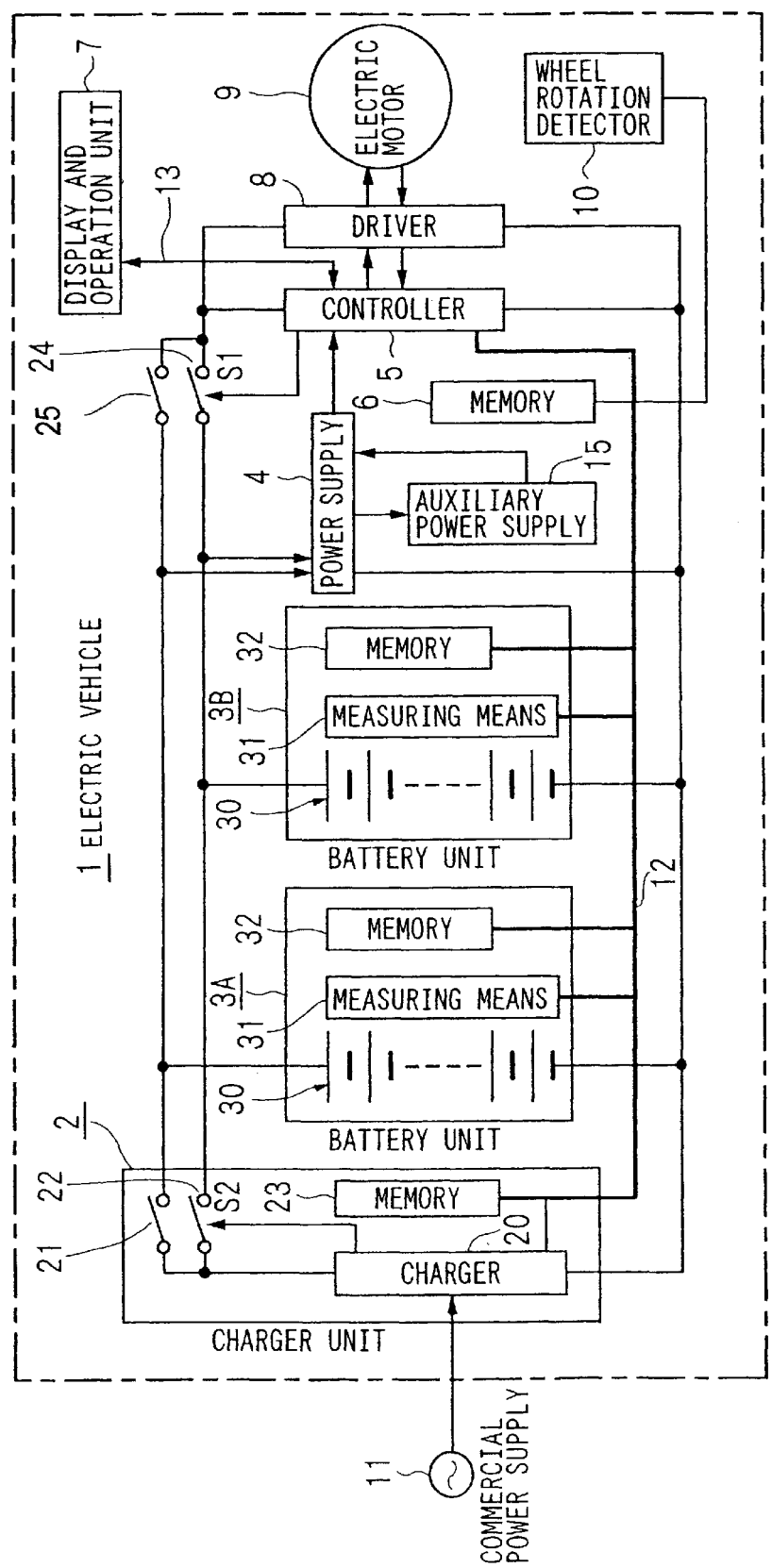
FIG. 7 is block circuit diagram showing the configuration of a second embodiment of the electric vehicle according to the invention.

Next, a second embodiment of the electric vehicle according to the invention will be described. FIG. 7 is a block circuit diagram showing the configuration of the electric vehicle, in which portions corresponding to those in FIG. 1 are assigned the same numerals.

An electric vehicle 1 of this embodiment differs from the electric vehicle 1 shown in FIG. 1 in that a charger unit 2 and battery units 3A and 3B are attachably and detachably mounted on a vehicle main body to be easily detachable from the vehicle main body. Therefore, it is possible to detach the charger unit 2 and the battery units 3A and 3B from the electric vehicle 1, connect the charger unit 2 to a commercial power supply 11, and connect the battery units 3A and 3B separately or both to the charger unit 2, so as to charge each secondary battery 30 thereof.

Further, the charger unit 2 contains a memory 23 constituted by a nonvolatile memory for storing at least a password and an interface with a system bus 12. Furthermore, respective memories 32 composed of nonvolatile memories in the battery units 3A and 3B are designed to store the password.

Meanwhile, on the side of the vehicle main body, an auxiliary power supply 15 by means of a secondary battery or the like is provided. The auxiliary power supply 15 is supplied with electric power from the battery unit 3A or 3B via a power supply 4 and charged when the battery units 3A and 3B are mounted on the electric vehicle 1, and sends the stored electric power to the power supply 4 when the battery units 3A and 3B are detached from the electric vehicle 1 so that the power supply 4 can supply electric power to the controller 5 and necessary parts.

The remaining configuration is the same as in the electric vehicle 1 shown in FIG. 1, and thus the explanation thereof is omitted.

The object of this embodiment is to make a configuration such that when the charger unit 2 or the battery units 3A and 3B are stolen, the charger unit and the battery unit can not be used unless all of the passwords stored in the memories 23 and 32 of the respective units, the password stored in the memory 6 in the vehicle main body and an inputted password match, so that if a charger unit or a battery unit stolen from another electric vehicle is mounted on an electric vehicle, the vehicle is prohibited from being driven.

Hence, action of the controller 5 in the electric vehicle 1 of the second embodiment is explained again with reference to the flowcharts in FIG. 3 to FIG. 6.

First, explanation is made regarding a function of preventing illegal use by means of the combined use of a key switch (mechanical key) and a password with FIG. 3.

In this case, processing or determination in steps A1 to A3 and A5 to A9 is also the same as in the above-described first embodiment.

However, when a password is inputted by the user by a predetermined method in step A3, the controller 5 reads and obtains via the system bus 12 from the memory 6 on the vehicle main body, and the memory 23 of the charger unit 2 and respective memories 32 of the battery units 3A and 3B, which are mounted, passwords stored (registered) respectively therein and compares them with the inputted password in step A4.

As a result, when all the passwords match, the controller 5 proceeds to step A5 and brings by a predetermined method the electric vehicle 1 into the state capable of being driven, but when at least one of passwords does not match, it proceeds to step A6 and counts the number of inputs of passwords.

Then, when the number of the inputs becomes the specified number or more in step A7, the controller 5 executes error processing in step A9 to bring the electric vehicle 1 from the password input state to the key-OFF state to thereby prohibit it from being driven.

Next, explanation is made regarding a function of preventing illegal use only by a password without using a key switch (mechanical key) with FIG. 4.

In this case, processing or determination in steps B1 to B3 and B5 to B9 is also the same as in the above-described first embodiment.

However, when a password is inputted by the user by a predetermined method in step B3, the controller 5 reads and obtains via the system bus 12 from the memory 6 on the vehicle main body, and the memory 23 of the charger unit 2 and respective memories 32 of the battery units 3A and 3B, which are mounted, passwords stored (registered) respectively therein and compares them with the inputted password in step B4.

As a result, when all the passwords match, the controller 5 proceeds to step B5 and brings the electric vehicle 1 by a predetermined method into the state capable of being driven, but when at least one of the passwords does not match, it proceeds to step B6 and counts the number of inputs of passwords.

Then, when the number of the inputs becomes the specified number or more in step B7, the controller 5 executes error processing in step B9 to bring the electric vehicle 1 from the password input state to the waiting state to thereby prohibit it from being driven.

Next, explanation is made with the flowchart in FIG. 5 regarding action when the electric vehicle 1 in the key-OFF state or in the waiting state is moved.

In this case, processing or determination in steps C1 to C6, C8 and C9 in FIG. 5 is also the same as in the above-described first embodiment.

However, after the controller 5 performs display of a request for input of a password on the display section in step C6, when a password is inputted by the user by a predetermined method, the controller 5 reads and obtains via the system bus 12 from the memory 6 on the vehicle main body, and the memory 23 of the charger unit 2 and respective memories 32 of the battery units 3A and 3B, which are mounted, passwords stored (registered) respectively therein and compares them with the inputted password in step C7.

As a result, when all the passwords match, the controller 5 stops the alarm such as the buzzer, the siren or the like in step C8, but when at least one of the passwords does not match, the controller 5 returns to step C5, performs again display of a request for input of a password on the display section in step C6 while the alarm, the siren or the like is kept given, and waits for a password to be inputted.

In this case, when the controller 5 determines that the moving distance is the specified value or more in step C4 in FIG. 5, it may perform display of a request for input of a password on the display section before giving an alarm, and when an inputted password matches all the registered passwords, it may end this processing without giving an alarm, and when a password is not inputted before a fixed period of time elapsed or when a password, even if inputted, does not match all the registered passwords, it may give an alarm such as a buzzer, a siren or the like.

Next, action of changing a password is explained using FIG. 6.

All the passwords stored in the respective memories 6, 23 and 32 need to match in order that the electric vehicle 1 and the mounted charger unit 2 and battery units 3A and 3B can not be used by a stranger but only by a person such as the owner or the like who has registered the password. Thus the configuration is made such that the processing can go into the password change mode by operation of the password change mode selector of the display and operation unit 7 only when all of the charger unit 2 and battery units 3A and 3B detachable from the electric vehicle 1 are mounted on the electric vehicle 1.

In this password change mode, processing or determination in steps D1, D3 to D6 and D8 to D10 shown in FIG. 6 by the controller 5 is also the same as in the above-described first embodiment.

However, after the controller 5 performs display of a request for input of a password on the display section in step D1, when a password is inputted by the user by a predetermined method, the controller 5 reads and obtains via the system bus 12 from the memory 6 on the vehicle main body, and the memory 23 of the charger unit 2 and respective memories 32 of the battery units 3A and 3B, which are mounted, passwords stored (registered) respectively therein and compares them with the inputted password in step D2.

As a result, when all the passwords match, the controller 5 performs display of a request for input of a new password on the display section in step D3, but when at least one of passwords does not match, it proceeds to step D8 and counts the number of inputs of passwords.

Further, in step D7, the controller 5 rewrites via the system bus 12 the new password on the passwords respectively stored in the memory 6 on the vehicle main body, and the memory 23 of the charger unit 2 and respective memories 32 of the battery units 3A and 3B, which are mounted, and displays the change of the password on the display section.

As described above, only when all of the charger unit 2 and battery units 3A and 3B detachable from the electric vehicle 1 are mounted on the electric vehicle 1 and the inputted password matches all the passwords stored in the respective memories 6, 23 and 32, it is possible to change the password by inputting a new password twice and to store the same new password in all the memories 6, 23 and 32.

It should be noted that the controller 5 performs all of the processing associated with prevention of illegal use and theft and the processing associated with change of a password according to the invention in each of the above-described embodiments, but, besides a controller for conducting control associated with drive of the electric vehicle 1, a controller may be provided which performs the processing associated with prevention of illegal use and theft and the processing associated with change of a password according to the invention.

INDUSTRIAL APPLICABILITY

As has been described, the electric vehicle according to the invention can prevent illegal use and theft by storing therein a password in advance and allowing it to be driven only when the same password is inputted.

Further, when the vehicle is moved, an alarm is kept given unless a correct password is inputted, so as to prevent theft.

Furthermore, only a user who knows a registered password is allowed to change the password so as to enhance the effect of preventing illegal use and theft and improve usability.

A password is stored also in critical components such as a charger unit, a battery unit and the like, so that the password is managed to make it impossible to use the components when stolen.

What is claimed is:

1. An electric vehicle including at least a pack of rechargeable secondary battery and a charger for charging said secondary battery which are mounted on a vehicle main body to be attachable/detachable thereto/therefrom respectively, an electric motor for driving a running section such as wheels and the like, and a controller for conducting control to drive said electric motor by electric power of said secondary battery, comprising:

nonvolatile memories for storing a password arranged in said vehicle main body, each said secondary battery and said charger respectively; and a display and operation unit for inputting a password and means for bringing said vehicle into a state capable of being driven only when the password inputted through said display and operation unit matches all of the passwords stored in said respective memories of said vehicle main body, each said secondary battery and said charger, arranged in said vehicle main body.

2. The electric vehicle according to claim 1, further comprising:

a wheel rotation detector for detecting rotation of the wheels;

an alarm generator such as a buzzer, a siren or the like; and means for determining whether or not said vehicle is moved by a predetermined specified value or more based on rotation detection information from said wheel rotation detector in a key-OFF state or in a waiting state, allowing said alarm generator to give an alarm and said display and operation unit to display a request for input of a password when the determination is made that said vehicle is moved by the predetermined specified value or more, and thereafter stopping the alarm by said alarm generator only when the password inputted through said display and operation unit matches all of the passwords stored in said respective memories of said vehicle main body, each said secondary battery and said charger.

3. The electric vehicle according to claim 1, further comprising:

a wheel rotation detector for detecting rotation of the wheels;

an alarm generator such as a buzzer, a siren or the like; and means for determining whether or not said vehicle is moved by a predetermined specified value or more based on rotation detection information from said wheel rotation detector in a key-OFF state or in a waiting state, allowing said display and operation unit to display a request for input of a password when the determination is made that said vehicle is moved by the predetermined specified value or more, and thereafter allowing said alarm generator to give an alarm when a password is not inputted through said display and operation unit in a predetermined period of time or when the inputted password does not match all of the passwords stored in said respective memories of said vehicle main body, each said secondary battery and said charger.

4. The electric vehicle according to claim 1, wherein said display and operation unit has a password change mode selector, and means is provided which, only when a password inputted through said display and operation unit matches all of the passwords stored in said respective memories of said vehicle main body, each said secondary battery and said charger after a password change mode is selected by said password change mode selector, allows said respective memories to rewrite and store a new password inputted thereafter.

5. An electric vehicle including at least a pack of rechargeable secondary battery and a charger for charging said secondary battery which are mounted on a vehicle main body to be attachable/detachable thereto/therefrom respectively, an electric motor for driving a running section such as wheels and the like, and a controller for conducting control to drive said electric motor by electric power of said secondary battery, comprising:

nonvolatile memories for storing a password arranged in said vehicle main body, each said secondary battery and said charger respectively; and a display and operation unit for inputting a password, a key switch, and means for bringing said vehicle into a state capable of being driven only when the password inputted through said display and operation unit matches all of the passwords stored in said respective memories of said vehicle main body, each said secondary battery and said charger after said key switch turns ON, arranged in said vehicle main body.

6. The electric vehicle according to claim 5, further comprising:

a wheel rotation detector for detecting rotation of the wheels;

an alarm generator such as a buzzer, a siren or the like; and means for determining whether or not said vehicle is moved by a predetermined specified value or more based on rotation detection information from said wheel rotation detector in a key-OFF state or in a waiting state, allowing said alarm generator to give an alarm and said display and operation unit to display a request for input of a password when the determination is made that said vehicle is moved by the predetermined specified value or more, and thereafter stopping the alarm by said alarm generator only when the password inputted through said display and operation unit matches all of the passwords stored in said respective memories of said vehicle main body, each said secondary battery and said charger.

7. The electric vehicle according to claim 5, further comprising:

a wheel rotation detector for detecting rotation of the wheels;

an alarm generator such as a buzzer, a siren or the like; and means for determining whether or not said vehicle is moved by a predetermined specified value or more based on rotation detection information from said wheel rotation detector in a key-OFF state or in a waiting state, allowing said display and operation unit to display a request for input of a password when the determination is made that said vehicle is moved by the predetermined specified value or more, and thereafter allowing said alarm generator to give an alarm when a password is not inputted through said display and operation unit in a predetermined period of time or when the inputted password does not match all of the passwords stored in said respective memories of said vehicle main body, each said secondary battery and said charger.

8. The electric vehicle according to claim 5, wherein said display and operation unit has a password change mode selector, and means is provided which, only when a password inputted through said display and operation unit matches all of the passwords stored in said respective memories of said vehicle main body, each said secondary battery and said charger after a password change mode is selected by said password change mode selector, allows said respective memories to rewrite and store a new password inputted thereafter.

\* \* \* \* \*